July 25, 1950 — H. E. ROSE — 2,516,594
WINDSHIELD WIPER

Filed April 7, 1944 — 4 Sheets-Sheet 1

INVENTOR:
HOWARD E. ROSE,
BY Kingsland, Rogers & Ezell
ATTORNEYS.

July 25, 1950 H. E. ROSE 2,516,594
WINDSHIELD WIPER
Filed April 7, 1944 4 Sheets-Sheet 3

INVENTOR:
HOWARD E. ROSE,
By Kingsland, Rogers & Ezell
ATTORNEYS.

Patented July 25, 1950

2,516,594

UNITED STATES PATENT OFFICE 2,516,594

WINDSHIELD WIPER

Howard E. Rose, Peninsula, Ohio, assignor, by mesne assignments, to Kearfott Company, Inc., New York, N. Y., a corporation of New York Application April 7, 1944, Serial No. 529,964

20 Claims. (Cl. 15—253)

The present invention relates to a windshield wiper, and more particularly to one that is fluid operated. A particular object of the invention is to provide improvements on a wiper mechanism such as is described in co-pending application, Serial No. 467,359, filed November 30, 1942, now Patent No. 2,446,611, August 10, 1948.

Among these improvements are the provision of a simplified windshield unit wherein a valve construction is made of parts easier to fabricate, and which give superior operation. More particularly, it is an object to provide a windshield unit having valves that attain the objects of slide valves but without the disadvantage thereof.

A further object of the invention is to provide a speed control valve having means readily adaptable to varying supply pressures.

Further objects are to provide a compact, easily made, easily repairable reversing valve mechanism that is pressure responsive to reverse when the fluid pressure in either of its lines attains a predetermined value.

A further object is to provide a valve mechanism having a locking valve that is automatically operable to retain the windshield wiper mechanisms immovable when the main control valve is closed to render the mechanism inoperative.

In the drawings:

Fig. 10 is a diagrammatic view of the motive unit with the elements disposed to show the several connections therein;

Figures 1, 2, 3, 4:
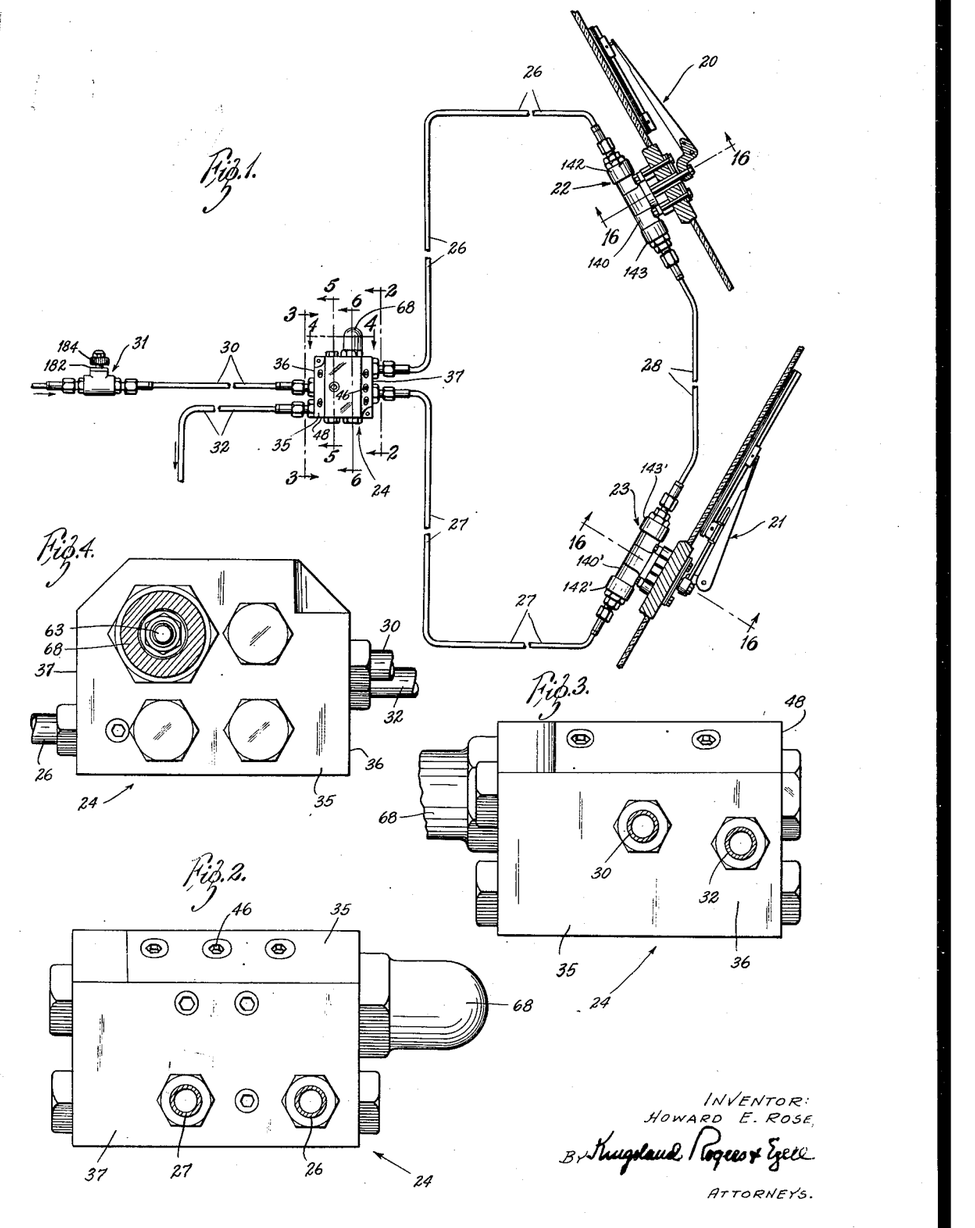
Fig. 1 (sheet 1) is a view of the windshield wiper as installed, certain parts being in section.
Fig. 2 is a side elevation of the motive unit or control valve mechanism shown from the right side thereof on the line 2—2 of Fig. 1.
Fig. 3 is an elevation of the motive unit taken from the left side of Fig. 1 on the line 3—3.
Fig. 4 is an end elevation of the motive means taken at the top thereof in Fig. 1 on the line 4—4.

In general, the mechanism includes one or more windshield wiping devices such as 20 and 21, operated respectively by window control units 22 and 23. The window control units, in turn, are operated by a motive unit or valve control 24 that is connected to the window units 22 and 23 by tubes 26 and 27, respectively, the two window units being connected together through a tube 28. The motive control 24 receives pressure fluid from a line 30 that is controlled by a speed control 31. The motive control 24 exhausts into a low pressure line 32.

The overall functioning involves the admission through the speed control of hydraulic fluid at a pressure determined by the setting of the speed control 31 in the line 30. This high pressure fluid is automatically alternately introduced through the motive unit 24 into the tubes 26 and 27. When one of the tubes 26 and 27 is receiving high pressure, the other is connected through the motive unit 24 to the low pressure return 32. The high pressure liquid in one of the lines 26 and 27 acts against a piston mechanism within the respective windshield unit to which the particular line is connected. This piston mechanism causes operation of its wiper 20 or 21, as the case may be, and, in the same operation, effects high pressure in fluid within the connecting line 28, so that the piston mechanism of the other windshield unit may be operated.

The two piston mechanisms contain pressure resisting means so that when, and only when, both wipers 20 and 21 are stopped, the high pressure in the system to the right of the motive unit 24 will attain a certain high value. When this value is reached, the motive unit 24 operates to reverse the connections between the inlet 30 and the exhaust 32 on the one hand, and the lines 26 and 27 on the other, so that the opposite of the two lines 26 and 27 are connected to pressure and exhaust, respectively. Thereupon, the wipers 20 and 21 are moved in the other direction until both are stopped and the critical pressure condition is again obtained.

From the foregoing, it may be understood that the motive unit 24 comprises a valve mechanism including a valve that directly determines the connections of the lines 26 and 27 with the pressure and exhaust lines 30 and 32, and includes pressure responsive means to effect the positioning of the said valve. This motive unit will now be described.

This valve includes a body 35, into one face 36 of which the inlet 30 and the exhaust 32 are connected. At the end of the opposite face 37 of the valve body 35 the wiper connections 26 and 27 are introduced.

Figures 8, 9:
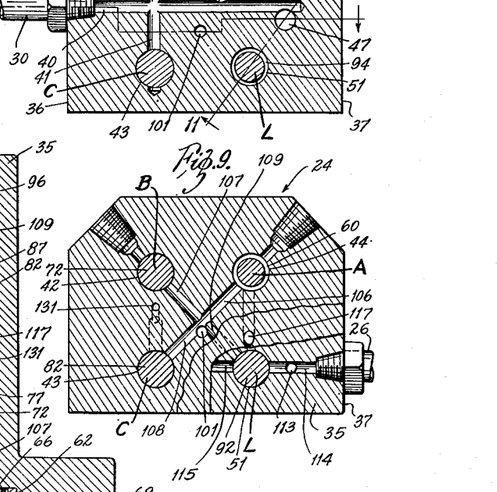
Fig. 8 is a transverse medial section through the motive unit taken on the line 8—8 of Figs. 5 and 6.
Fig. 9 is a transverse section through the motive unit taken on the line 9—9 of Figs. 5 and 6.
Figures 11, 12, 13, 14:
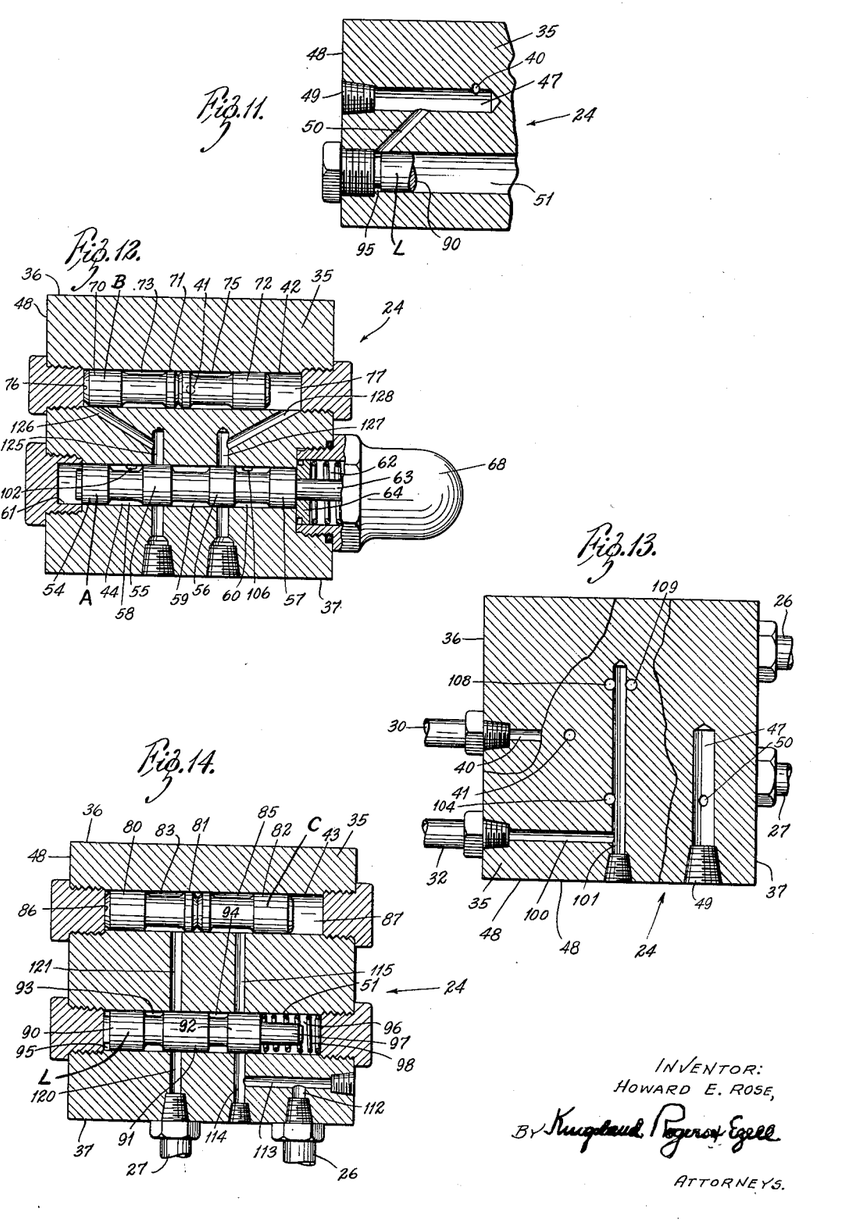
Fig. 11 is a section taken on the line 11—11 at the lower right corner of Fig. 8.
Fig. 12 (sheet 3) is a horizontal section on the line 12—12 of Fig. 6.
Fig. 13 is a horizontal section on the line 13—13 of Fig. 6.
Fig. 14 is a horizontal section on the line 14—14 of Fig. 6.

The pressure line 30 connects into a port 40 (Figs. 8, 13). The line 40 connects with a vertical port 41 (Fig. 8) leading to valve chambers 42 and 43 receiving the valves B and C, respectively. The port 40 also connects with a valve chamber 44 of the valve A by an angular port 45 bored down from one of the angular upper faces of the valve body 35 and plugged at 46.

The port 40 is also connected with a port 47 drilled in from a face 48 of the valve and plugged at 49. This port 47 (Fig. 11) is connected by an angular port 50 with one end of the chamber 51 of the valve L.

From the foregoing, it may be seen that pressure is constantly admitted to the three valves A, B and C at the middle of their respective valve chambers, and is also connected to the end of the valve L at all times.

It will be observed further that the valve A, operating in its valve chamber 44, is a slide valve having sealing portions 54, 55, 56 and 57 between which are disposed porting spaces 58, 59 and 60. The valve A slides within the chamber 44 and the opposite ends of the chamber, 61 and 62, are the pressure chambers for effecting displacement of this valve. The valve has an extension 63 receiving two washers 64 and 65 spread apart by a coil spring 66 to the maximum distance permitted by opposed washer engaging shoulders, one at the base of the extension 63, and the other determined by a nut 67 threaded adjustably onto the extension. A cap 68 is screwed into the valve body. This cap 68 actually contains the pressure chamber 62.

It will be seen that the valve B, operating in the valve chamber 42, is a slide valve having sealing portions 70, 71 and 72. The portion 71 is provided with a balancing groove. Between the portions 70 and 71 is a porting space 73. Between the portions 71 and 72 is a porting space 75. The ends of the valve chamber 42, which constitute pressure chambers for the valve, are designated at 76 and 77.

It will be seen further that the valve C, operating within the valve chamber 43, has sealing portions 80, 81 and 82, which, as shown, provide porting spaces 83 and 85. The sealing portion 81 has a balancing groove therearound. The two operating pressure chambers are designated 86, 87.

The valve L, operating within the valve chamber 51, includes sealing portions 90, 91 and 92, which provide porting spaces 93 and 94, as shown. The operating pressure chamber is designated at 95, and a spring chamber 96 is shown at the opposite end. The valve body on this valve L has an extension 97 within the chamber 96 receiving a compression coil spring 98, normally urging the valve to the left in the drawing.

Figure 7:
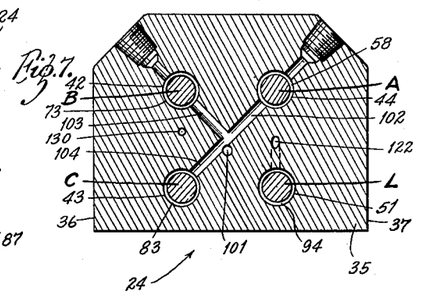
Fig. 7 is a vertical transverse section through the motive unit taken on the line 7—7 of Figs. 5 and 6.

The exhaust line 32 is connected to a port 100 (Fig. 13), and thence to a cross port 101 bored in from the face 48 of the valve. The port 101 is connected by angularly disposed ports with three of the valves, as shown in Fig. 7, through ports leading to the leftward ends of each of the valve chambers. A port 102 leads to the valve A, a port 103 leads to the valve B, and a port 104 leads to the valve C.

Referring to Fig. 9, it will be seen that there is a port 106 connected from the exhaust port 101 to the other end of the valve A, a port 107 connected to the other end of the valve B, and a port 108 connected to the other end of the valve C, and a port 109 connected into the spring chamber 96 of the valve L. All of the ports 100 through 109 are constantly connected to the exhaust line 32 through the ports 100 and 101.

Figure 6:
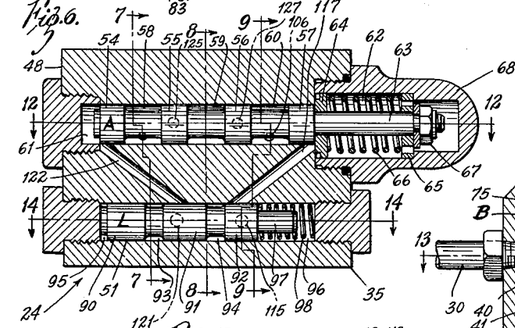
Fig. 6 is a vertical section through the motive unit taken on the line 6—6 of Fig. 1.

The two wiper lines 26 and 27 are connected directly to the chamber 51 of the valve L (Fig. 14). The line 26 is connected to a port 112, leading to a cross port 113, connected to a port 114 that, in the position shown, registers with a sealing portion 92 of the locking valve L. The port 114 is continued on the other side of the sealing portion 92 as a port 115 leading to the chamber 43 of the valve C and, as shown, to the space 85 thereof. As shown in Fig. 6, the valve chamber 51 is also connected by a port 117 with the pressure chamber 62 of the valve A.

The line 27 is connected into a line 120 leading to the chamber 51 of the valve L, and shown as registering with the sealing portion 91 thereof, beyond which it continues as a port 121 opening into the chamber 43 of the valve C, where, in the position shown, it registers with the porting space 83 thereof. Again referring to Fig. 6, it will be seen that the port 122 connects the valve chamber 51 with the pressure chamber 61 at the other end of the valve A. The ports 115 and 117 open into the chamber 51 of the valve L at the same distance along the axis thereof. The ports 121 and 122 do likewise.

The valve A controls the pressure conditions in the pressure chambers of the valve B. Referring to Fig. 12, it will be seen that the chamber 44 is connected by ports 125 and 126 to the pressure chamber 76 of the valve B. It is also connected by ports 127 and 128 to the pressure chamber 77 at the other end of this valve B. When the valve A is in the neutral position shown, the ports 125 and 127 are closed by the sealing portions 55 and 56 of the valve A.

Figure 5:
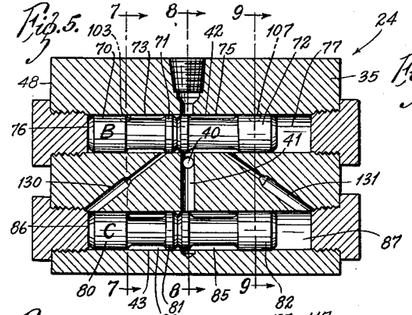
Fig. 5 (sheet 2) is a vertical section through the motive unit taken on the line 5—5 of Fig. 1.

The valve B, in turn, controls the pressure conditions in the pressure chambers for operating the valve C. In Fig. 5, it will be seen that constricted ports 130 and 131 lead from the valve chamber 42 of the valve B respectively to the chambers 86 and 87 of the valve C.

Figures 16, 17:
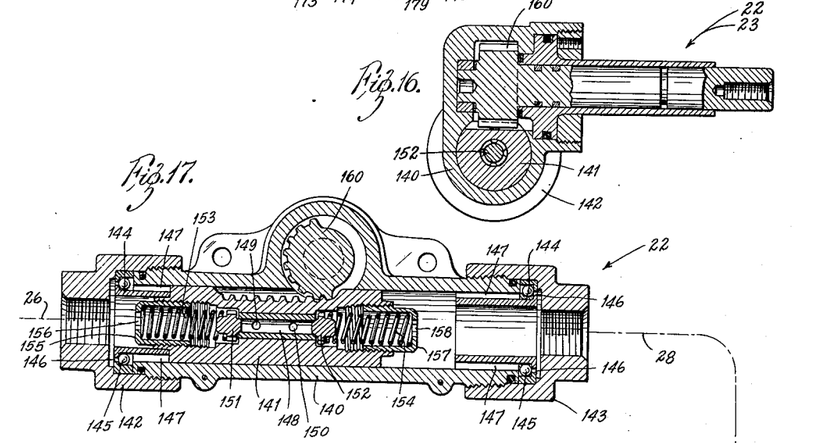
Fig. 16 is a transverse section through each of the window control units taken on the lines 16—16 of Fig. 1.
Fig. 17 is an axial section through one of the window control units in a first operating position.
Figure 18:
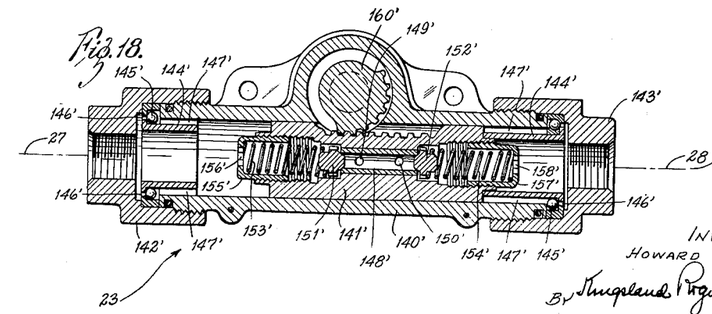
Fig. 18 is an axial section through the other window control unit.

The wiper units shown in Figs. 16–18 are identical. Each includes a housing or cylinder 140 in which a piston 141 reciprocates. The cylinder 140 has a cap 142 at one end, and a cap 143 at the other. Each cap holds a check valve and retainer 144 in position. The retainers are identical, being annular in shape and having grooves 147 to receive ball check valves 145 controlling small ports 146. The grooves in which the balls are disposed are continued to the end of the flange. It will be seen that the retainers are shaped so that the balls are held in the grooves by the end of the cylinder 140. The length of each retainer 144 determines the limit of the piston stroke in its direction. Use of retainers of different lengths easily varies the length of the strokes.

The piston 141 has a central bore therethrough, the center part of which receives a tubular sleeve 148. The sleeve has holes 149 and 150 through its walls for purposes to be described. The opposite ends of this sleeve 148 are adapted to be closed by valves 151 and 152. The valve 151 is urged into sealing position by a coil spring 153 and a similar coil spring 154 acts against the valve 152. A cap 155, open at 156, contains the spring 153 and a similar cap 157, open at 158, contains the other spring 154.

The cap 142 of the wiper unit 22 is connected to the line 26, and the cap 143 is connected to the line 28, which leads to the other wiper unit 23, identical with the first one. The parts of the second element 23 are designated by the same reference numerals with primes annexed thereto. Consequently, the line 28 will connect into the cap 143' and the cap 142' will connect to the line 27.

The pistons 141 and 141' have rack portions thereon that operate, respectively, gears 160 and 160' connected to one of the wiper elements here shown at 20.

Figure 15:
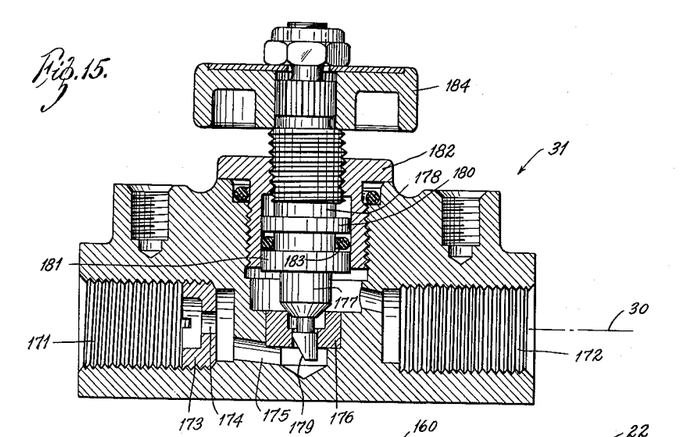
Fig. 15 (sheet 4) is a transverse view through the speed control valve.

The speed control valve 31 is shown in detail in Fig. 15. It includes an inlet port 171 connected to the pressure supply and an outlet 172 connected to the line 30. The inlet threads are adapted to receive a collar 173 having a port 174 therethrough. The collar has a kerf to receive a screw driver for its insertion and removal. By this means a collar may be installed that has a port 174 of a proper size to give the desired pressure conditions.

The inlet 171 connects with the port 175 leading to a valve seat member 176. The seat member 176 receives a valve plug 177 formed on a valve stem 178 with a notched guiding extension 179 slidably in the seat member 176. The notch on the extension 179 provides increasing flow as the valve stem is lifted. The valve stem has spaced flanges 180 and 181 slidable within the cap 182, and receiving a rubber ring seal 183. The stem is threaded through the cap 182 and has a handle 184 for operating the same.

*Operation*

To start the wipers, the valve 13 is opened by turning its handle 184 to admit fluid under pressure to the line 30. This fluid under pressure then enters the valve 35, and, referring to Fig. 10, is immediately distributed to the porting space 59 of the valve A (assuming all of the valves to be in the position shown), to the porting space 75 of the valve B, to the porting space 85 of the valve C, and to the chamber 95 of the valve L. The locking valve L in the position of Fig. 10 has its sealing portions 91 and 92 disposed across the outlet ports 26 and 27 leading to the wipers, so that they are cut off. However, when the pressure fluid is admitted by the speed control valve 31, it overcomes the force of the spring 98, acting on the valve L, and that valve will be moved over so that it disposes the porting space 93 to connect the line 27 with the port 121, and disposes the space 94 to connect the line 26 with the port 115. Thereupon pressure will flow from the line 30 through the lines 40 and 41 to the space 85 of the valve C, through the line 115, and to the line 26. At the same time, the pressure fluid is admitted from the port 115 through the line 117 to the chamber 61 of the valve A.

With the locking valve L moved as heretofore indicated, the other line 27 at the other end of the wiper units will be in communication with the line 121 leading to the space 83 of the valve C, which at this time also registers with the port 104 leading to the exhaust line 32. Whereupon the other end of the wiper units is exhausted to low pressure. At the same time, the line 122 is connected to exhaust, and this relieves the chamber 61 of the valve A.

When pressure is introduced into the line 26, it flows therethrough into the wiper unit 140, where it acts against the left end of the piston 141. It flows through the port 156 and the cap 155, but is normally prevented from passing into the sleeve 148 by the valve 151. When this pressure reaches a predetermined value, acting upon the exposed end of the sleeve 148, it will displace the same to the right to move it away from the valve 151, the said valve having radial extensions preventing its following the sleeve. This opening of the valve 151 admits pressure fluid against the end of the valve 152. Pressure acting against the end of the sleeve 148, and against the inner part of the valve 152, will move both to the right against the spring 154. When a predetermined pressure exists, the displacement will have been such as to expose the hole 150 to the right side of the piston; whereupon the liquid will flow into the line 28.

The resistance offered by the spring 154 is greater than the normal resistance to displacement of the entire piston 141 and associated windshield wiping elements, so that this pressure fluid will displace the piston to the right. When the piston is stopped by the engagement of its right end against the retainer 144 at the right, the pressure within the flange to the left of the piston may be built up further until it displaces the sleeve 148 and opens the hole 150. Thereupon it will flow through the line 28 filling the same, and will enter through the cap 143' into the cylinder 140', and act against the right end of the piston 141', so that it tends to displace this piston to the left in Fig. 18. The piston will yield to the left, as the resistance of the wiping mechanism is less than the resistance offered by the spring 153', until the piston stops in the left end of the cylinder. Thereupon, the pressure in the line 28, the line 26, and the cylinder 140 will tend to increase to displace the sleeve 148' and to overcome the spring 153'.

It will be observed that at this point the springs 154 and 153' are in series. Consequently, before both may be displaced the fluid pressure must attain a high value above that required to displace a single one of the valves. Before this last maximum pressure is attained, however, the control mechanism 35 will be operated as follows.

It has been noted previously that the pressure in the line 26 is acting within the chamber 62 of the relief valve A. The locking valve L is opened when the speed control valve 31 is open. The valve A resists displacement in accordance with the force exerted by the spring 66. This spring is designed to exert a force that is less than the force exerted by the pressure fluid upon the valve A, when all of the window element springs are in series, but greater than the fluid pressure when one less than all of the said springs are in series. To illustrate, the normal maximum operating pressure to move the wiper units is 400 p. s. i. The valve A is set to operate at 450 p. s. i. Where two windshield units are used, each valve may have an effective resistance of 250 p. s. i.

Consequently, the valve A is not moved when the spring 154 yields in the window element 22. But, when the force of the spring 153' in the window element 23 is added as a resistance, the valve A is shifted before the spring 153' yields.

The foregoing action will cause the valve A to move from its neutral position toward the left in Fig. 10. When this occurs, the pressure port 45 is connected to the ports 125 and 126 through the space 59, thus admitting pressure fluid to the chamber 76 of the valve B to move the same to the right. At the same time, the displacement of the valve A connects the ports 127, 128, leading from the other actuating chamber 76 of the valve B to the exhaust line 106 through the porting space 66 of the valve A. This permits the fluid within the chamber 77 to escape to the exhaust line 32, so that the high pressure admitted to the opposite chamber 76 of the valve B may effect displacement of this valve to the right.

When the valve B moves to the right in Fig. 10, the pressure line 40 is changed from the porting space 75 to the porting space 73, as the sealing portion 71 moves from one side of the center to the other. This action also connects the pressure line to the restricted port 130 leading to the chamber 86 at the left of the valve C. It also connects the other operating chamber 87 of the valve C through the line 131 to the space 75 of the valve B to the exhaust line 107. In the meanwhile, the space 70 of the valve B seals the exhaust ports 103 and 104 from the space 76.

The foregoing action of admitting pressure fluid to the chamber 86, and exhausting the chamber 87 of the valve C, causes the same to be moved to the right. This action shifts the pressure application from the line 26 to the line 27. In order to do this, the pressure lines 40, 41 are shifted by displacement of the portion 81 of the valve C from the space 85 of that valve to the space 83. This introduces pressure fluid from the line 40, 41 through the space 83 to the line 121, whence it passes through the open locking valve to the line 27.

At the same time, the space 85 is displaced to connect the port 115 with the exhaust port 108, so that the other line 26 is connected to exhaust.

It will be seen that the directional valve C is the one that finally causes the reversal of the pressure conditions of the wiper units. Since the ports 130 and 131 are restricted, the valve C will not be displaced completely until the valve B has been completely displaced. This action eliminates the necessity of a snap-action means on the wiper unit, because it insures that the pressure conditions, acting to displace the valve A through the ports 117 or 122, will always remain without change until the valve B has completely moved. After the valve B has taken its new position fully, it controls the porting to the valve C regardless of whether the valve A returns to neutral position or not.

As soon as the pressure in the line 26 is relieved into exhaust, the pressure within the line 117 is relieved and the spring 66 forthwith returns the valve A to its neutral position. This displaces the spaces 55 and 56 across the ports 125 and 127, and hydraulically locks the valve B in position. The valve C is, as a consequence, held in its position by the fixed pressure condition set by the valve B.

With the pressure conditions thus reversed, the line 27 will become the high pressure line, the line 26 the low pressure line, and the pressures within the two windshield units 22 and 23 will be directly reversed from those previously described. The high pressure introduced in the line 27 will act against the left of the piston 141' until the same has moved to its limit, whereupon the sleeve 150' will be displaced and will open.

It will be recognized that at this time the space between the two pistons 141' and 141 will be filled with liquid from the previous initial operation. Consequently, the displacement of the piston 141' to the right will, through the transmission of force by the entrapped liquid, correspondingly displace the piston 141 to the left. Both wiper elements will, therefore, move simultaneously. Should there be any escape of the entrapped liquid, the unit 141' will reach the limit of its stroke before the piston 141 reaches its limit. Thereupon the valve 150' will open and enough liquid will flow past it to cause displacement of the piston 141 until it is stopped, whereupon both valve springs 154' and 153 will be put in series, causing a greater force resistance than that exerted by the spring 66 upon the valve A. The valve A will then move from its neutral position to the right, reversing in succession the valves B and C, and finally reversing the pressure conditions in the lines 27 and 26.

When the speed control valve 31 is cut off at any time, and the high pressure reduces, the locking valve L will close, as its pressure chamber 95 is relieved by leakage around the several slide valves.

It will be observed that the pistons on the windshield units, as they approach the ends of their strokes, slip into the flanges of the retainers 144. The liquid trapped in the grooves 147 must bleed out past the slightly tapered end of the pistons 141 and 141', producing a cushioned stop for the pistons.

Should one of the wipers be stopped short of the end of its stroke, the effect will merely be that the other wiper is caused to go completely to the end of its stroke, and then upon return the two will act together. This comes about because the reversing pressure conditions are not met until both wipers are stopped at the same time. It is only when both are stopped, that both springs are put in series. Prior to that time, if one stops, its spring will yield and bypass oil either to cause operation of the other to the end of its stroke, or to permit operation of the other to the end of its stroke, depending upon whether the lead wiper or the trailing wiper has been blocked.

Furthermore, the wipers will always synchronize immediately whenever they have gone out of synchronism. This comes about because in either direction of travel they always move as far as permitted until both are stopped, which normally is when both pistons have struck their respective retainer members.

It will be seen that the locking valve L moves to locking position whenever the main fluid line 30 is cut off. Thus, if the speed control valve 31 is closed completely, pressure in the line 30 drops off and immediately allows the locking valve to shift to the position shown. Thereupon the fluid is not relieved from the windshield units and they are locked hydraulically against movement in response to wind pressure and the like.

What is claimed is:

1. In a mechanism of the kind described, a high pressure line, a low pressure line, a first work line and a second work line, a control mechanism for selectively connecting the high pressure line to the first work line and the low pressure line to the second work line and vice versa, said control mechanism including valve means, operated in response to predetermined pressure in the work line receiving high pressure, to shift the connection to admit high pressure to the other work line, valving means operated only upon the existence of high pressure in the high pressure line to provide connection between the work lines and a pressure line, said last-named valve means comprising a pressure responsive valve device connected to receive pressure from the high pressure line independently of said shiftable valve means, for displacement to open position, and means normally urging the valve device to closed position, the valve device having valve elements closing both work lines when it is not displaced to open position.

2. In a mechanism of the kind described, a fluid pressure windshield wiper unit having a member moved back and forth in response to high pressure on opposite sides thereof, a high pressure line connection, a low pressure line connection, a first work line to conduct fluid to one side of the member, a second work line connected to the other side thereof, control mechanism interposed between the high and low pressure connections and the work lines to connect the high pressure line connection to the first work line and the low pressure line connection to the second work line and vice versa, said control mechanism including reversing valve means responsive to the pressure in the high pressure work line to shift the connections to connect the high pressure line connection to the second work line, and a pressure operated locking valve means in the work lines, said locking valve having opposite actuating chambers interconnected with the high and low pressure line connections independently of said reversing valve means, whereby whenever the pressure difference between said high and low pressure connections to the reversing valve exceeds a predetermined value said locking valve will open said work lines to the reversing valve means, and when said pressure difference descends below said value said locking valve will close to lock the fluid in the windshield wiper unit and hold the unit against movement.

3. In a mechanism of the kind described, a plurality of windshield wiping units, each comprising a movable member adapted to be moved oppositely in response to application of fluid pressure to opposite sides thereof, a line connecting one side of each movable member with one side of the movable member of the next unit, a high pressure line leading into the first unit, a low pressure line leading from the last unit, pressure responsive by-pass means to admit pressure fluid around each movable member upon the attainment of a predetermined resistance to movement thereof so that when pressure fluid is introduced through the high pressure line it may act against all of the by-pass means in series; a reversing control mechanism adapted to connect a high pressure source with the high pressure line and a low pressure exhaust with the low pressure line and vice versa; said control mechanism including a valve means operable in response to a high pressure in the high pressure line greater than all but one of the by-passing resistances but less than all of them; said valve means being adapted when moved to effect reversal of the pressure connections to the high and low pressure lines; a pressure-operated locking valve interposed between the reversing valve and the windshield units; means urging the locking valve into closed position to block flow of oil through the high and low pressure lines; and an operating pressure chamber for the locking valve receiving high pressure from the high pressure line independently of the reversing control mechanism to effect shifting of the locking valve to open position when the pressure in the high pressure line is above a predetermined minimum value.

4. In a mechanism of the kind described, a control valve including a valve housing for slide valves therein, a high pressure inlet into the housing, a low pressure outlet from the housing, and a pair of working lines leading from the housing, one of said valves comprising a locking valve, means normally urging the locking valve to a cut-off position wherein it blocks connection of the two working lines from the other valves, and means connecting the high pressure inlet to the other valves and to the locking valve at all times, said connection to the locking valve being such as to cause said high pressure to move the same to open position against said urging means.

5. A hydraulically operated windshield wiper unit including a cylinder means, a movable device in the cylinder means adapted to receive fluid pressures on opposite sides thereof for movement back and forth, by-pass means including a conduit to connect one side of the movable means with the other side thereof and pressure-responsive valve means controlling said conduit, said valve means including a hollow slidable device in said conduit, two oppositely spring-pressed valves, one urged against each end of said hollow device to close the opening therethrough, said slidable device being exposed at its ends to the pressure conditions on opposite sides of the movable device, and movable under influence of predetermined excess of pressure at one of its ends over that at its other end, means limiting the movement of each of the valve means to permit the hollow device to move away from each of the valve means under said pressure conditions, so that fluid under pressure may flow into the hollow device and act against the other valve means at the other end thereof, and displace the hollow device and the said other valve means, and means to effect communication around the movable device after predetermined movement of the hollow device.

6. A hydraulically operated windshield wiper unit including a cylinder means, a movable device in the cylinder means adapted to receive fluid pressures on opposite sides thereof for movement back and forth, by-pass means including a conduit to connect one side of the movable means with the other side thereof and pressure-responsive valve means controlling said conduit, said valve means including a hollow slidable device in said conduit, two oppositely spring-pressed valves, one urged against each end of said hollow device to close the opening therethrough, said slidable device being exposed at its ends to the pressure conditions on opposite sides of the movable device, and movable under influence of predetermined excess of pressure at one of its ends over that at its other end, means limiting the movement of each of the valve means to permit the hollow device to move away from each of the valve means under said pressure conditions, so that fluid under pressure may flow into the hollow device and act against the other valve means at the other end thereof, and displace the hollow device and the said other valve means, and means to effect communication around the movable device after predetermined movement of the hollow device, said last-named means comprising port means through the wall of the hollow device adapted to be exposed upon displacement of the same as aforesaid.

7. A hydraulically operated mechanism including a hydraulic line and a valve device therein, said line having a constricted passage therein, enlarged at its opposite ends, a hollow slide having port means therein and reciprocable in the constricted passage, and being substantially coextensive therewith, a pair of poppet valves resiliently urged oppositely against the ends of the slide to close the port means thereof, said poppet valves being movable toward and away from the respective ends of the hollow slide, means limiting movements of the poppet valves in their directions toward the slide, said valves being shaped so that, when closed against the ends of the hollow device, they expose the said ends, whereby when fluid pressure is applied to either of said valves and the corresponding one of said ends the hollow device may be forced away from the valve, and conduit means opened upon predetermined movement of the hollow device.

8. A valve means for use with a windshield wiper mechanism comprising a hydraulically operated windshield wiper unit, a hydraulic pressure line adapted to be connected to the unit to introduce operating fluid thereto, the valve means being adapted to be interposed in said line to control the pressure in said line to control the speed of the windshield wiper unit, said valve means having a housing containing a valve seat therein, a valve cooperable with the seat, and a threaded port leading from the seat through the casing wall, said port being adapted to be connected with said line, and a removable orifice member comprising a threaded plug with a hole therethrough, said plug being insertable into the threaded port prior to connection with the line.

9. In a mechanism of the kind described, a pressure control having a fluid pressure inlet and an outlet, a pair of fluid-pressure lines, and pressure-responsive means selectively to connect one of said lines to the inlet and the other to the outlet and vice versa, said means comprising a directional valve adapted to be moved to effect connection of the first line to the inlet and the second to the outlet, and vice versa, said directional valve being adapted to be moved by application of pressure oppositely thereon, and an oppositely movable, pressure-operated relief valve movable for admitting pressure selectively in one of two lines in accordance with the position of the relief valve, said relief valve being connected to receive the high pressure as it is applied to the fluid-pressure lines, for displacement thereof in one direction or the other in accordance with pressure conditions of said lines, force means resisting displacement of the relief valve, normally urging it in both directions toward neutral position and permitting displacement of the relief valve only when the pressure of the respective fluid-pressure line attains a predetermined value, and means responsive to the pressures in said two relief valve lines to effect shifting of the directional valve to its other position reversing pressure connections of said lines.

10. In an apparatus of the kind described, a pressure control having a fluid-pressure inlet and an exhaust, a pair of fluid-pressure lines, and pressure-responsive means selectively to connect one of said lines to the inlet and the other to the outlet and vice versa, said means comprising a valve adapted to be moved to effect connection of the first line to the inlet and the second to the outlet, and vice versa, means controlling the position of said valve comprising mechanism movable in opposite directions from a neutral position in response to pressure changes oppositely acting thereon, yieldable means urging the same into neutral position, ports connecting opposite sides of the mechanism with the respective lines, whereby said mechanism responds to pressure conditions thereof, said yieldable means resisting displacement until the pressure in one of the lines receiving fluid under pressure attains a predetermined value, and means operated to reverse the valve upon displacement of the mechanism.

11. In an apparatus of the kind described, a pressure control having a fluid-pressure inlet and an exhaust, a pair of fluid-pressure lines, and pressure-responsive means selectively to connect one of said lines to the inlet and the other to the outlet and vice versa, said means comprising a valve adapted to be moved to effect connection of the first line to the inlet and the second to the outlet, and vice versa, means controlling the position of said valve comprising mechanism movable in opposite directions from a neutral position in response to pressure changes oppositely acting thereon, yieldable means urging the same into neutral position, ports connecting opposite sides of the mechanism with the respective lines, whereby said mechanism responds to pressure conditions thereof, said yieldable means resisting displacement until the pressure in one of the lines receiving fluid under pressure attains a predetermined value, and means operated to reverse the valve upon displacement of the mechanism, said last-named means comprising a second valve operable into two positions, in one of which it connects one side of the first valve to pressure and the other side to exhaust, and vice versa in the second position, means operating the second valve to one position or the other in response to the operation of the mechanism from its neutral position one way or the other, and means insuring complete operation of the second valve by the time the first valve has shifted to effectively reduce the pressure acting to shift the mechanism.

12. In a mechanism of the kind described, a pressure control having a fluid pressure inlet and an exhaust, a pair of fluid-pressure lines, and means selectively to connect one line to the inlet and the other to exhaust, and vice versa, said means comprising a first valve displaceable to effect said connections selectively, and opposite pressure means adapted selectively for connection to fluid pressure or exhaust for displacement of said first valve, a second valve controlling said opposite pressure means of the first valve, the second valve being displaceable to connect selectively one side of said means to pressure and the other to exhaust, and vice versa, means restricting the fluid flow around said second valve to said opposite pressure means of the first valve to delay action of the latter, opposite fluid pressure means adapted selectively for connection to fluid pressure or exhaust for displacement of the second valve, a third valve having opposite pressure-responsive operating means connected to the fluid-pressure lines and under control of the first valve, yieldable means urging the third valve into neutral position, said third valve being adapted to be displaced by admission of fluid under pressure to its opposite pressure means and building up of said pressure to predetermined values exceeding the resistance of said yielding means, said third valve, upon such displacement, being adapted to connect the pressure means of the second valve to pressure and exhaust to reverse the second valve, said connection being free to cause rapid movement of the second valve, whereupon the second valve more slowly effects reversal of the first, and the last-named valve reverses pressure conditions in the lines.

13. In a mechanism of the kind described, a pressure control having a fluid-pressure inlet and an outlet, a pair of fluid-pressure lines, and pressure-responsive means selectively to connect one of said lines to the inlet and the other to the outlet and vice versa, said means comprising a directional valve adapted to be moved to effect connection of the first line to the inlet and the second to the outlet, and vice versa, said directional valve being adapted to be moved by application of pressure oppositely thereon, and relief valve means movable for admitting pressure selectively in one of two lines in accordance with the position of the relief valve means, said relief valve means being connected to receive the high pressure as it is applied to the fluid-pressure lines, for displacement thereof in accordance with pressure conditions of said lines, force means resisting displacement of the relief valve means, and permitting displacement of the relief valve means only when the pressure of the respective fluid-pressure line attains a predetermined value, and means responsive to the pressures in said two relief valve lines to effect shifting of the directional valve to its other position reversing pressure connections of said lines, said last means including a pilot valve interposed between the relief valve means and the directional valve, said pilot valve being movable from a position to admit high pressure to one side of the directional valve to a position to admit high pressure to the opposite side thereof, said pilot valve being also connected to be oppositely moved by the high pressure received from the valve, and means to insure full movement of the pilot valve before the directional valve reaches the end of its movement.

14. In a reversing mechanism for use with a high fluid-pressure line and a low fluid pressure line, a first and a second port adapted to be respectively connected to the high and the low pressure lines, and vice versa, a directional valve movable to opposite positions to determine which of the connections shall be made, a fluid pressure-operated pilot valve movable to opposite positions for controlling movement of the directional valve, there being opposite pressure chambers for the pilot valve, means responsive to pressure in the outlet connected with high pressure, oppositely to connect the pressure chambers of the pilot valve to the high and low pressure ports, respectively, and vice versa, to effect movement of the pilot valve to reverse the position of the directional valve upon attainment of a predetermined pressure in the high pressure outlet, and means regulating flow of fluid to both pressure chambers of the pilot valve to insure full movement of the pilot valve by the time the directional valve has moved to relieve the connection of the high pressure line on the outlet initially connected therewith.

15. In a mechanism of the kind described, a pressure control having a fluid-pressure inlet and an exhaust, a pair of fluid-pressure ports, and means selectively to connect one port to the inlet and the other to exhaust, and vice versa, said means comprising a first valve displaceable to effect said connections selectively, and opposite pressure means adapted selectively for connection to fluid pressure or exhaust for displacement of said first valve, a second valve for controlling said opposite pressure means of said first valve, the second valve being displaceable to connect selectively one side of said means to pressure and the other to exhaust, and vice versa, means restricting the fluid flow around said second valve to both of said opposite pressure means of the first valve to delay movement of the latter, opposite fluid-pressure means adapted selectively for connection to fluid pressure or exhaust for displacement of the second valve, fluid pressure-responsive means to connect the opposite pressure means of the second valve to pressure and exhaust, respectively, and to reverse said connections, said connections for operation of the second valve being relatively unrestricted to insure full operation thereof at least by the time the first valve has been moved.

16. In a mechanism of the kind described, a pressure control having a fluid-pressure inlet and an exhaust, a pair of fluid-pressure ports, and means selectively to connect one port to the inlet and the other to exhaust, and vice versa, said means comprising a first valve displaceable to effect said connections selectively, and opposite pressure means adapted selectively for connection to fluid pressure or exhaust for displacement of said first valve, a second valve for controlling said opposite pressure means of said first valve, the second valve being displaceable to connect selectively one side of said means to pressure and the other to exhaust, and vice versa, means restricting the fluid flow around said second valve to each of said opposite pressure means of the first valve to delay movement of the latter, opposite fluid-pressure means adapted selectively for connection to fluid pressure or exhaust for displacement of the second valve, fluid pressure-responsive means connected to said fluid-pressure ports whereby to operate when the fluid pressure in the port connected with high pressure attains a predetermined value, and passage means valved by the fluid pressure-responsive means for selectively connecting one of the opposite pressure means of the second valve to high pressure and the other to low pressure, and vice versa, whereby the second valve will be moved upon attainment of the predetermined pressure in the high pressure port, and means to prevent movement of the first valve to relieve the high pressure port until the second valve has been moved.

17. A reversing valve mechanism including a housing, a high pressure inlet, a low pressure outlet, a pair of work outlets leading from the housing, locking valve means normally urged to close said work outlets, pressure means connected with the high pressure inlet to open the valve means when high pressure exists in the inlet, a directional valve in the housing movable to selectively connect one work line with the inlet and the other with the outlet, and vice versa, relief valve means in the housing, pressure-responsive means oppositely connecting the relief valve means with the work lines so that the relief valve means is moved in response to pressure conditions in the work lines, and means in the housing, responsive to movement of the relief valve means, to move the directional valve to reverse the connections of the inlet and outlet with the work lines, the connection of the pressure means of the locking valve means and the inlet being independent of said directional valve and relief valve means.

18. A reversing valve mechanism including a housing, a high pressure inlet and a low pressure outlet thereinto, a pair of work lines connected from the housing, a pressure-operated relief valve having opposite pressure chambers connected respectively to the two work lines, spring means normally urging the relief valve to intermediate position, the relief valve having a high pressure passage flanked by two low pressure passages separated from the high pressure passage, the high pressure passage being connected with the high pressure inlet, a directional valve in the housing having two separated passages thereon, the directional valve being connected with the high pressure inlet and the two work lines, a pair of exhaust passages connected with the directional valve, arranged so that the directional valve can move to connect the high pressure inlet to either work line through one of its passages and to connect the other work line to the exhaust passage through the other passage, and vice versa, opposite pressure chambers for operation of the directional valve, means for connecting said chambers to the high and low pressure lines, said means including fluid lines controlled by the relief valve, said relief valve in intermediate position being adapted to close said lines, and when moved in one direction from intermediate position, disposing its high pressure passage to connect one fluid line to the high pressure line and disposing one of its flanking passages to connect the other fluid line to the low pressure outlet, and when moved in the other direction from intermediate position, said relief valve making opposite connections for said fluid lines.

19. A reversing valve mechanism including a housing, a high pressure inlet and a low pressure outlet thereinto, a pair of work lines connected from the housing, a pressure-operated relief valve having opposite pressure chambers connected respectively to the two work lines, spring means normally urging the relief valve to intermediate position, the relief valve having a high pressure passage flanked by two low pressure passages separated from the high pressure passage, the high pressure passage being connected with the high pressure inlet, a directional valve in the housing having two separated passages thereon, the directional valve being connected with the high pressure inlet and the two work lines, a pair of exhaust passages connected with the directional valve, arranged so that the directional valve can move to connect the high pressure inlet to either work line through one of its passages and to connect the other work line to the exhaust passage through the other passage, and vice versa, opposite pressure chambers for operation of the directional valve, means for connecting said chambers to the high and low pressure lines, said means including fluid lines controlled by the relief valve, said relief valve in intermediate position being adapted to close said lines, and when moved in one direction from intermediate position, disposing its high pressure passage to connect one fluid line to the high pressure line and disposing one of its flanking passages to connect the other fluid line to the low pressure outlet, and when moved in the other direction from intermediate position, said relief valve making opposite connections for said fluid lines, and said means for connecting said chambers of the directional valve including also a pressure-operated pilot valve having opposite chambers connected to said fluid lines of the relief valve for the pilot valve to be operated in response to the aforesaid movement of the relief valve, said pilot valve having two separated valving passages, and having connections to the high pressure inlet and to the exhaust, and having fluid lines to the opposite chambers of the directional valve, said pilot valve being movable from a position to connect the high pressure inlet to one chamber of the directional valve, and the exhaust to the other chamber of said directional valve, and vice versa.

20. A reversing valve mechanism including a housing, a high pressure inlet and a low pressure outlet thereinto, a pair of work lines connected from the housing, a pressure-operated relief valve having opposite pressure chambers connected respectively to the two work lines, spring means normally urging the relief valve to intermediate position, the relief valve having a high pressure passage flanked by two low pressure passages, separated from the high pressure passage, the high pressure passage being connected with the high pressure inlet, a directional valve in the housing having two separated passages thereon, the directional valve being connected with the high pressure inlet and the two work lines, a pair of exhaust passages connected with the directional valve, arranged so that the directional valve can move to connect the high pressure inlet to either work line through one of its passages and to connect the other work line to the exhaust passage through the other passage, and vice versa, opposite pressure chambers for operation of the directional valve, means for connecting said chambers to the high and low pressure lines, said means including fluid lines controlled by the relief valve, said relief valve in intermediate position beng adapted to close said lines, and when moved in one direction from intermediate position, disposing its high pressure passage to connect one fluid line to the high pressure line and disposing one of its flanking passages to connect the other fluid line to the low pressure outlet, and when moved in the other direction from intermediate position, said relief valve making opposite connections for said fluid lines, and fluid pressure-operated locking valve means having fluid chamber means connected with the high pressure inlet, said locking valve means being movable by pressure in said inlet to open position, and means to move said locking valve means to closed position in absence of pressure in said inlet, said locking valve means being disposed in said work lines to open them when the locking valve means is open.

HOWARD E. ROSE.

REFERENCES CITED

The following references are of record in the file of this patent:

UNITED STATES PATENTS

| Number | Name | Date |
| --- | --- | --- |
| 509,992 | Wood | Dec. 5, 1893 |
| 1,952,690 | Strom | Mar. 27, 1934 |
| 1,955,154 | Temple | Apr. 17, 1934 |
| 2,060,684 | Moorhouse | Nov. 10, 1936 |
| 2,070,720 | Ernst | Feb. 16, 1937 |
| 2,122,045 | Rose et al. | June 28, 1938 |
| 2,165,966 | Hall et al. | July 11, 1939 |
| 2,193,736 | Onions | Mar. 12, 1940 |
| 2,223,792 | Muir | Dec. 3, 1940 |
| 2,287,179 | Kocher | June 23, 1942 |
| 2,287,709 | Ringman | June 23, 1942 |
| 2,298,457 | Berges | Oct. 13, 1942 |
| 2,302,232 | Mac Neil | Nov. 17, 1942 |
| 2,304,279 | Rappl | Dec. 8, 1942 |
| 2,304,380 | Shaeffer | Dec. 8, 1942 |
| 2,370,376 | Snell | Feb. 27, 1945 |